United States Patent [19]

Sauer et al.

[11] 4,264,846
[45] Apr. 28, 1981

[54] SPEED CONTROL AND BRAKING CIRCUIT FOR A SERIES CONNECTED DC MACHINE

[75] Inventors: Helmut Sauer, Fürth, Fed. Rep. of Germany; Peter Loderer, Gmunden, Australia; Lothar Roth; Klaus Breuer, both of Frankfurt am Main, Fed. Rep. of Germany

[73] Assignee: Siemens Aktiengesellschaft, Munich, Fed. Rep. of Germany

[21] Appl. No.: 968,257

[22] Filed: Dec. 11, 1978

[30] Foreign Application Priority Data

Dec. 12, 1977 [DE] Fed. Rep. of Germany ....... 2755246

[51] Int. Cl.³ .............................................. H02P 7/06
[52] U.S. Cl. .................................. 318/249; 318/269; 318/332; 318/341
[58] Field of Search ............... 318/249, 250, 252, 269, 318/332, 341, 345 C, 345 G, 356, 379

[56] References Cited

U.S. PATENT DOCUMENTS 3,651,390  3/1972  Vidal et al. ........................... 318/269

Primary Examiner—J. V. Truhe
Assistant Examiner—John W. Redman
Attorney, Agent, or Firm—Kenyon & Kenyon

[57] ABSTRACT

A continuous speed control and braking circuit for a DC propulsion motor having armature and field currents set largely independent of each other to permit operation in the field weakening region of the motor. A direct current control element is pulsed for setting the armature current; a series circuit containing the field winding and a switch is connected in parallel to the DC control element; and a field current bypass diode is shunted across the field winding.

16 Claims, 14 Drawing Figures

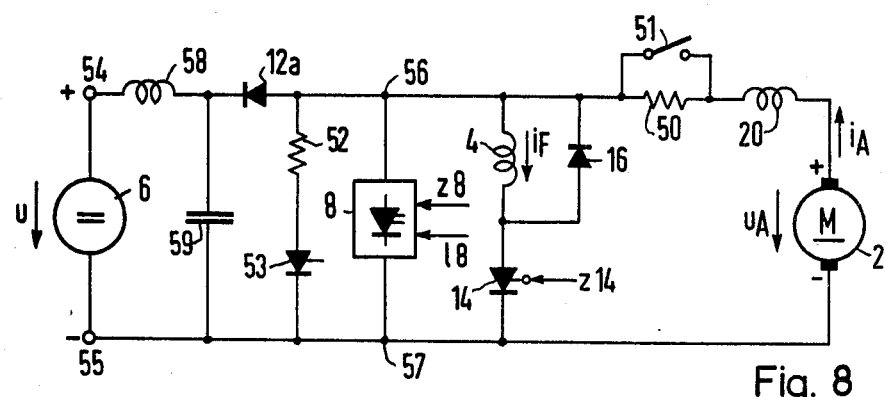
Fig. 8
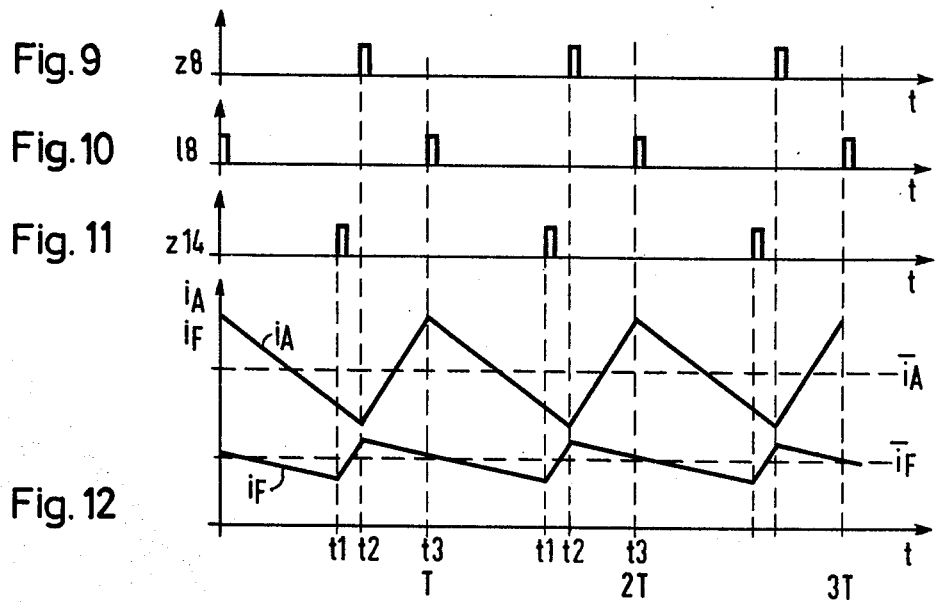
Fig. 9
Fig. 10
Fig. 11
Fig. 12
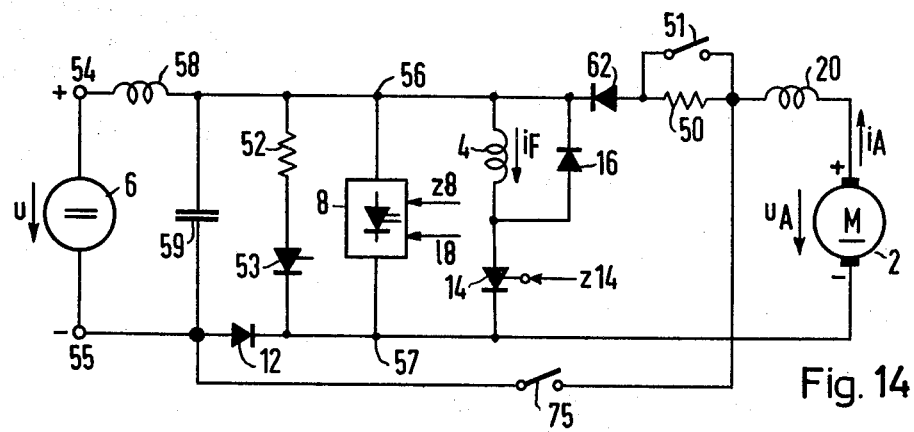
Fig. 14

SPEED CONTROL AND BRAKING CIRCUIT FOR A SERIES CONNECTED DC MACHINE

BACKGROUND OF THE INVENTION a. Field of the Invention

This invention relates to a speed control (travel) circuit and/or braking circuit for a series DC motor. More particularly, it relates to a series DC motor operating in the field weakening region in which the armature current is set by a pulsed control element and in which the field has a bypass valve.

b. Description of the Prior Art

In most cases, series connected direct current motors are designed so that they generate the full countervoltage at a fraction of their maximum permissible speed. In the following, this speed is called the "characteristic speed". Such motors are often operated from zero speed to the characteristic speed with the maximum permissible armature current, thus gaining maximum acceleration. In order to obtain maximum acceleration above the characteristic speed, the field strength is steadily reduced as speed is increased from the characteristic speed upward (here called the field weakening region). The field is weakened in such a manner that the armature current does not exceed the value of the maximally permissible armature current and remains constant at this value. Since the armature current and voltage of the motor are constant in the field weakening region, the power output remains constant while the delivered torque, which is determined by the field current, decreases with increasing speed. It should be noted that the degree of field weakening, i.e., the ratio of field current to armature current, must not fall below a predetermined minimum value as the speed increases further. If this minimum value is reached at a particular high speed, then the armature current is also reduced with further increases in speed. Thus, at the maximum permissible speed, neither the field current nor the armature current have reached the maximally permissible values.

Two speed control circuits having a final DC control element are known which utilize the principle of field weakening to increase speed above the characteristic speed.

One such speed control circuit has been used for some time by Siemens AG in vehicles using direct current propulsion, particularly in trolley cars and subways. It comprises a series circuit consisting of a DC cotrol element and a smoothing choke between the DC line and the DC series motor as well as a bypass valve in shunt with the smoothing choke and the DC series machine. In addition, a field weakening resistor, which can be shorted successively by a series of switching members, is connected parallel to the field winding via an electromechanical switch. If the speed is increased beyond the characteristic speed, an increasing part of the armature current is conducted through the stepwise variable, field weakening resistor. As the effective field weakening resistance is reduced, the branch current in this resistor increases and the branch current in the parallel field winding decreases. The sum of the two branch currents is always equal to the armature current, which is held at its maximum permissible value when starting at maximum torque.

The second speed control circuit, which also serves for starting, is described in the journal, "Elektrotechnik und Maschinenbau", vol. 85 (1968), No. 3, pages 110 to 117 and shown, particularly in FIG. 5. This circuit is also intended for the DC propulsion of vehicles. It has an input circuit consisting of a choke and a capacitor, which is connected to the DC supply line and, via a DC final control element, to the armature winding of the DC series machine. Here the field winding is not connected to the main current; instead, it is shunted across the armature winding in series with a first bypass diode. The field winding, in turn, is shunted by a second bypass diode. In this speed control circuit, the field weakening occurs automatically if the duty cycle of the DC control element is high. The particular DC final control element provided utilizes a main thyristor with a parallel quenching circuit. The quenching circuit consists of a quenching thyristor in series with a quenching capacitor; the series circuit of a reversing choke and a reversing diode is connected antiparallel to the quenching thyristor. In this circuit, the quenching capacitor in the DC control element must be overloaded at the end of the quenching process, i.e., an overvoltage is produced at the DC control element. The DC control element must therefore be designed at considerable cost for this overvoltage.

The DC series machine in which the armature winding and the field or exciter winding are connected in series is used for various drive purposes, especially in the electric propulsion of vehicles. If this machine is braked, it is desirable, for several reasons, to be able to set the field current flowing through the field winding at a lower level than the current flowing through the armature winding, i.e., also to operate in the field weakening region.

Another braking circuit of the type mentioned above is described in Siemens-Zeitschrift, vol. 47 (1973), no. 3 pages 155 to 159, particularly at FIG. 2. This braking circuit is intended for electric trolley propulsion. It is derived from a travel circuit by regrouping electrical components by means of switching devices. The known braking circuit is arranged for pure resistance braking operation, i.e., not for mixed regenerative and resistance braking. It is designed so that, for braking, i.e., after the individual components of the speed control circuit are regrouped, a braking current can flow in a closed circuit which is formed of the field and armature windings of the DC series motor, a smoothing choke, a DC control element which is shunted by a bypass valve in series with a braking switch and an ohmic braking resistor, a further uncontrolled bypass valve and a series circuit consisting of two more braking resistors, in the order given. The last resistors mentioned can be shorted by contactors. By pulsing the DC control element, the effective braking resistance is changed continuously. A series circuit consisting of a switch, e.g., a switching contactor, and an ohmic field weakening resistor is arranged in parallel to the field winding. By closing this field weakening switch, the motor field may be shunted when the speed of the trolley vehicle is high. This makes the field current smaller than the armature current (field weakening operation) and can prevent an excessively large torque at high speed when the brake is set. In the field weakening region, part of the field current is carried by the field weakening resistor, which is connected parallel to the field winding. In this circuit the field weakening resistor is connected and disconnected by means of the switch in dependence on the speed. The disadvantage here is that the mechanical switch used as the field weakening switch is subject to a certain amount of wear. It is a further disadvantage that, due to the resistance switching, the field weakening only increases or decreases in steps.

It is desirable for the setting of the mutually independent armature and field currents for braking a series DC motor that the field weakening be accomplished gradually and without mechanical switches. The desired braking circuit should be usable not only for pure resistance braking operation or for pure regenerative braking operation, but also for mixed regenerative and resistance braking operation.

The journal "E and M", vol. 85 (1968), no. 3, pages 110 to 117, especially FIG. 8e with associated text, describes a braking circuit for a DC machine using the principle of regenerative braking with automatic field weakening. Here, the armature winding of a series DC machine is shunted by a series circuit consisting of a DC control element and the field winding. The field winding is shunted by a bypass diode which carries the field current if the DC control element is shut off. The armature winding continues to be connected to a load circuit via a return diode.

This prior art braking circuit has the disadvantage that the field weakening sets in automatically only if the DC control element is driven near zero; field weakening is not possible in the rest of the control range.

German Offenlegungsschrift No. 23 29 146 describes a braking circuit for mixed regenerative and resistance braking operation of a series DC machine operating as a generator. The armature and field winding are combined here, preferably in a series circuit, by a stabilizing resistor. This series circuit is shunted by a DC control element as well as by a braking branch, consisting of a braking resistor and a controlled braking valve in series. The series circuit is further connected, via a return diode, to a DC source which can absorb current at least during some of the time. The braking circuit is intended particularly for the series DC machine of a propulsion vehicle which is supplied from a DC trolley wire system. Field weakening operation is not provided in this braking circuit.

It is an object of the invention to provide a combined speed control and/or braking circuit of the type described above in which no overvoltage is produced at the DC control element at the instant when the control element is opened. In addition, a new method for operating the travel circuit is provided.

SUMMARY OF THE INVENTION

This invention solves the problems set forth above by commutating the current flowing in the armature winding as well as in the field winding to a separate bypass circuit at the instant of opening of the DC control element.

Thus, a series circuit consisting of the field winding and a switch is shunted across the DC control element, and a bypass valve is shunted across the field winding, forming a bypass circuit for the field current.

As the DC control element, a mechanical chopper can be used. Advantageously, however, a transistor chopper or, more particularly, a thyristor DC control element such as that described in German Pat. No. 12 42 289, is used. The latter comprises a controlled main valve, with a quenching device connected parallel thereto. If such a DC control element is used, a supplemental controlled valve, particularly a thyristor, is preferably used as the switch or "field valve". A switching transistor can also be used as the switch, however. If a thyristor is used as the switch, the latter is quenched by the quenching device of the DC control element at the same time.

For operation as a speed control circuit in the field weakening region from a predetermined characteristic speed on, the DC control element is inserted into the connection between the DC source and the armature winding of the series DC machine, the bypass diode is polarized in the blocking direction for current from the DC source and the supplemental bypass valve is shunted across the armature winding of the series DC machine.

In an additional feature, the travel circuit is provided with an ohmic resistor in the bypass circuit comprising the field winding and the second bypass valve and this series circuit is shunted across the field winding. In this way, the time required for decay of the field current in the bypass circuit is determined by the value of the ohmic resistor. The resistance must be adapted to the specific application and may be as small as 0.1 ohm.

Usually, the inductance of the armature winding is too small to smooth the armature current sufficiently. In this case, a smoothing choke is inserted between the DC control element and the armature of the series DC machine in a manner well known in the art, being included in the first bypass circuit. Then the series circuit consisting of the smoothing choke and the armature winding is shunted by the first bypass valve in a manner well known in the art.

A particularly advantageous and simple embodiment of the invention brings one electrode of the DC control element, one electrode of the supplemental controlled valve, one electrode of the first bypass valve and/or one electrode of the second bypass valve together in a common tie point. In this case, the individual components are at one and the same electrical potential and a common heat sink can be used for them.

In another embodiment of the speed control circuit, an ohmic field weakening resistor is connected in series with the DC control element in such a way that the series circuit consisting of the field winding and the switch is shunted across the series circuit consisting of the DC control element and the field weakening resistor. This field weakening resistor can serve two purposes: first, it serves to limit the DC control element current if misfiring occurs; second, the DC control element no longer need be pulsed in the top speed range but can remain permanently switched on like the switch. If the speed is increased further, the armature current is reduced. This can be important so that, in the field weakening region, the degree of field weakening does not drop below a predetermined lower limit.

When the DC control element comprises a controlled main valve with a quenching device connected in parallel, a particularly advantageous method for operating the travel circuit is provided by the invention in that, when operating in the region without field weakening with the main valve of the DC control element turned off or fired only for reversing the charge of the quenching capacitor and with the quenching device activated, the switch is operated instead of the main valve. This operating procedure makes it possible to use a control unit customary for DC control elements. The switch, which may in particular be a supplemental thyristor, can then be considered as a second main valve.

Another procedure for operating the speed control circuit is distinguished by the feature that, in the weakened field region, the supplemental valve is fired first;

that during the "on" period of the supplemental valve, the main valve of the DC control element is also fired; and that the time interval between the firing times of these two valves is controlled in dependence on a control variable.

In the speed control circuit described in the already cited journal "Elektrotechnik und Maschinenbau", loc. cit., field weakening (field current smaller than armature current) is possible only with almost full drive, i.e., only when the speed has almost reached the characteristic speed. It is a particular advantage of the present invention that such field weakening can be accomplished in practically the entire operating range from zero speed to the maximum speed, and, therefore, especially at speeds which are somewhat below the characteristic speed, as for instance, during starting. It is just the starting process and the operation at very low speeds that present difficulties in conventional DC control elements because, due to minimum times that must be adhered to, downward of regulation the output voltage of the DC control element is not possible without further measures (for instance, reducing the timing pulse rate). Heretofore, the measures have resulted in additional cost or have had other disadvantages such as interference with other consumers. Assuming that the maximally permissible armature current causes a voltage drop across the ohmic resistances in the load circuit which is at least as large as the minimum voltage at the output of the DC control element, the invention enables operation at constant timing pulse rate over the entire operating range, if use is made of field weakening during the start the smaller starting torque so obtained results in increased travel comfort in a vehicle.

It should also be pointed out that in speed control circuits constructed according to the teachings of the invention, the armature current and the field current can be set largely independently of each other and are infinitely variable.

The braking circuit according to the invention also is distinguished by the feature that the field winding and its bypass and valve series connected switch are shunt connected to the DC control element. The same configuration is also present in the speed control circuit. The transition from speed control to braking circuit and vice versa can therefore be made in a very simple manner by means of switching devices.

Still another feature of the invention is that, in braking, the armature current and the field current can be changed for braking the DC series machine largely independently of each other and in an infinitely variable manner. Mechanical switches or contactors are not required. Field weakening is possible at any duty cycle of the DC control element. This is important particularly for mixed resistive and regenerative braking operation, since it permits adjustment for optimum efficiency. This feature of the invention also is of advantage for pure resistance braking operation.

BRIEF DESCRIPTION OF THE DRAWINGS

FIG. 8 shows a braking circuit embodying the teachings of the invention, which is useful for mixed regenerative and resistance braking operation;

FIG. 9 is a chart showing the waveforms of firing signals for the DC control element of the braking circuit of FIG. 8;

FIG. 10 illustrates the waveforms of quenching signals in the DC control element of the braking circuit of FIG. 8;

FIG. 11 shows the waveforms of firing signals of a field valve used as a switch in the braking circuit of FIG. 8;

FIG. 12 illustrates variation of the armature and field currents as a function of time in the DC series machine of the braking circuit shown in FIG. 8;

FIG. 14 illustrates a second embodiment of a braking circuit according to the teachings of the invention which results from actuation of the switching means of FIG. 13.

DETAILED DESCRIPTION OF THE INVENTION

Figure 1:
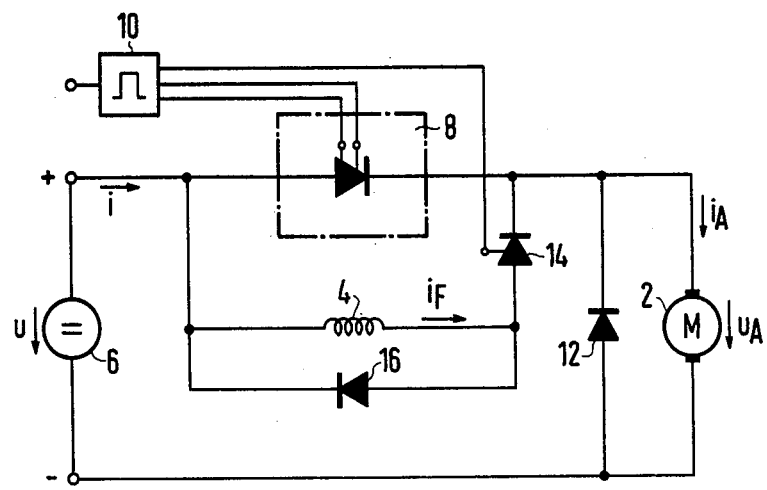
FIG. 1 is a schematic diagram of a speed control circuit embodying the teachings of the invention.

FIG. 1 shows a speed control circuit for the DC series motor of a propulsion vehicle (subway, trolley car). In it, the armature winding 2 and the field winding 4 of the DC series machine are only indirectly connected in series. For feeding the DC series machine with a current i, a DC source 6, having the voltage u, is provided. This may be a battery, but could also be, for example, an overhead trolley line with LC filter. A DC control element 8 is inserted into the connection between the positive pole of the DC source 6 and the armature winding 2. This is a conventional chopper circuit, which can comprise transistor or, in particular, a main thyristor with a quenching device. It may operate, for instance, at a pulse rate of 250 Hz. For controlling the DC control element 8, a control and regulating circuit 10 is provided. A first uncontrolled bypass valve 12, for instance, a semiconductor diode, is shunted across the armature winding 2.

A series circuit consisting of the field winding 4 and a switch 14 is shunted across the DC control element 8. The switch 14 can be a supplemental controlled valve, in particular, a thyristor, as shown. As will be made clear below, this thyristor acts as a second main valve of the DC control element 8 during operation outside the field weakening region. It is therefore polarized to conduct in the direction of the flow of the current i. The switch 14 is also actuated by the control and regulating circuit 10. If DC control element 8 comprises a thyristor with a parallel connected quenching device, the supplemental thyristor is quenched by the quenching device of the DC control element 8 at the same time. This is an especially advantageous feature of the invention.

A second uncontrolled bypass valve 16 is shunted across the field winding 4; it is polarized in the blocking direction for the flow of current i from the DC source 6.

The components 8, 12, 14 are arranged so that their cathodes are brought together in one tie point. This results in a particularly simple design.

It can be seen from FIG. 1 that the field winding 4 and the armature winding 2 each has a bypass circuit of its own. The bypass circuit of the armature winding 2, to which the armature current $i_A$ can be commutated, is formed by the armature winding and the first bypass valve 12. Similarly, the bypass circuit of the field winding 4, to which the field current $i_F$ can be commutated, is formed by the field winding 4 and the second bypass valve 16.

It will be understood by those skilled in the art that, in the matter preceding as well as that which follows, the word "valve" is used to broadly specify a device for regulating current flow 3, such as an electron tube or a semiconducting device, as will be understood by those skilled in the art. Thus, a bypass or uncontrolled valve may be a vacuum or semiconductor diode and a controllable valve may be a thyristor or the like.

Figure 2:
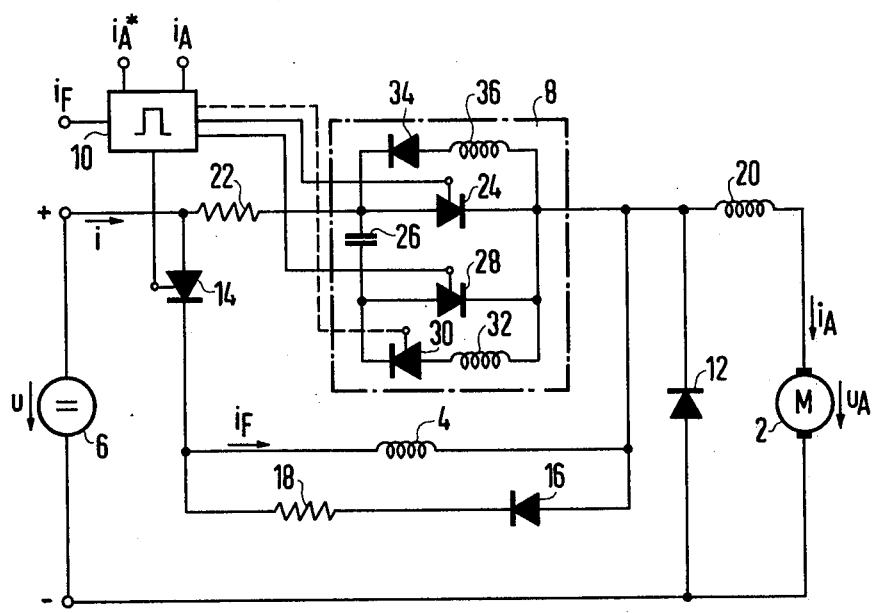
FIG. 2 is a schematic diagram of another speed control circuit embodying the teachings of the invention and showing the DC control element in detail.

In FIG. 2, a second speed control circuit is shown which is like that of FIG. 1 and which is particularly adapted for a vehicle using D.C. propulsion. It differs from the circuit of FIG. 1, in that an ohmic resistor 18 is inserted into the bypass circuit consisting of the field winding 4 and the second bypass valve 16. This resistor 18 serves to establish the time constant of this bypass circuit. Depending on the application, it can be made relatively small, for instance, 0.1 ohm. The arrangement is made so that the series circuit consisting of the bypass valve 16 and the resistor 18 is shunted across the field winding 4.

For the purpose of smoothing the armature current $i_A$, the armature winding 2 is connected in series with a smoothing choke 20. This is useful, particularly, if the pulsing rate is low. The arrangement is made so that the first bypass valve 12 is shunted across the series circuit consisting of the armature winding 2 and the smoothing choke 20.

A field weakening resistor 22 is connected in series with the DC control element 8. Field weakening resistor 22 insures that the armature current $i_A$ can be reduced at very high speeds ($n_2$ to $n_{max}$ in FIG. 3); to this end, the series circuit consisting of the field winding 4 and the switch 14 is shunted across the series circuit consisting of the DC control element 8 and the field weakening resistor 22. Here, too, the switch 14 is a controlled supplemental valve polarized in the direction of flow of the current i. The anode of this supplemental valve is connected (via resistor 22) to the anode of the DC control element 8 in a sense contrary to that of FIG. 1.

A particular circuit is shown in FIG. 2 as the DC control element 8. This DC control element is described in German Pat. No. 12 42 289. It comprises a controlled main valve 24 which is shunted by the series circuit consisting of a quenching capacitor 26 and a controlled quenching valve 28. Antiparallel to the latter is connected the series circuit consisting of an uncontrolled reversing valve 30 and a reversing choke 32. Instead of this uncontrolled reversing valve 30, a controlled reversing valve can also be used; such a valve is assumed later in the control and regulating circuit of FIG. 4 and would require the additional connection to it shown by dashed line. Antiparallel to the main valve 24 is further connected the series circuit consisting of an uncontrolled return valve 34 and a return choke 36. The chopper circuit just described for use as the DC control element 8 is only one of many that can be used in this purpose, as will be understood by those skilled in the art.

A total of three electrical variables are fed to the input terminals of control and regulating device 10 of FIG. 2. These are the actual value $i_A$ of the armature current, the reference value $i_A^*$ of the armature current and the actual value $i_F$ of the field current. The two actual values $i_A$ and $i_F$ are measured by measuring devices and the reference value $i_A$ is set by means of a control; the measuring devices and the controls are not shown in this Figure. The control and regulating device 10 is connected by control lines to the main valve 24, the quenching valve 28 and the supplementary valve 14. Another control line, shown in dashes, is connected to the reversing valve 30, when it is of the controlled type as indicated above.

The speed control circuit shown in FIG. 2 has the advantage that, in operation, the quenching capacitor 26 is not charged substantially beyond the voltage u of the DC source 6. The design of the DC control element therefore need only depend on the DC voltage u.

Figure 3:
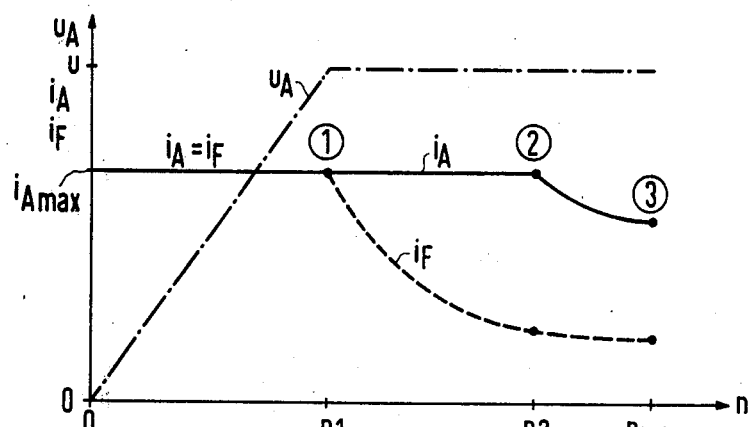
FIG. 3 is a graphic presentation of the relationship between operating currents and voltage as a function of the speed in the circuits of FIGS. 1 and 2.

The manner in which the speed control circuits of FIGS. 1 and 2 operate can be seen in FIG. 3. There, the variation of the armature voltage $u_A$, the armature current $i_A$ and the field current $i_F$ as a function of the speed n of the DC series machine is illustrated. A starting-up process will be described in the following.

Three speed regions are to be distinguished, which are traversed sequentially without steps:

a. No Field Weakening

Starting with the speed n=0, the armature voltage $u_A$ is increased in proportion to the drive (duty cycle) of the DC control element 8. The speed n of the DC series machine increases in proportion to the armature voltage $u_A$. The armature current $i_A$ and the field current $i_F$, which are equal during this starting process, are held here at a maximum value $i_{Amax}$ (by a current control circuit not shown in FIGS. 1 and 2). The starting process can take place, of course, with a smaller predetermined current value. At point 1, the armature voltage $u_A$ has reached the value of the DC voltage u of the DC source 6. At this point, the speed $n_1$ has been reached.

b. Field Weakening

From then on, operation is with field weakening. The field current $i_F$ is reduced gradually as shown by the dashed line, while the armature current $i_A$ retains the maximally permissible value $i_{Amax}$ and the armature voltage $u_A$ remains at the level u. At point 2, the degree of field weakening $k=(i_F/i_A)$ has reached a predetermined minimum value $K_{min}$. This minimum value may be, for instance, $K=\frac{1}{3}$. Here, the speed n has attained the level $n_2$.

c. Field Weakening and Armature Current Reduction

For reasons of the electrical operating behavior of the DC series motor, the degree of field weakening K must not fall below the minimum $K_{min}$. Therefore, the armature current $i_A$ is also reduced as the speed increases. At point 3, the maximum speed $n_{max}$ is then reached.

Moving away from the specific curves of FIG. 3, it should be noted that it is also possible, with the speed control circuits of FIGS. 1 or 2, to weaken the field in the speed range between n=0 and n=n$_1$, i.e., with i$_F$<i$_A$.

Regarding the operation of the speed control circuit of FIG. 2, the following can be said, keeping FIG. 3 in mind:

When going from speed n=0 to a speed n=n$_1$ (region a), no field weakening only the auxiliary valve 14 is periodically fired and the quenching device of the DC control element 8 is kept in operation; the main valve is briefly fired each time for the reversal. (In other embodiments of the DC control element 8, it is possible to leave the main valve of the DC control element 8 cut off entirely during this starting phase). During the "on" phase of the switch 14, the armature current i$_A$ and the field current i$_F$ flow jointly along the path 6, 14, 4, 20, 2 and 6. In the bypass phase, the field current i$_F$ can continue to flow through the resistor 18 and the second bypass valve 16, while the armature current i$_A$ makes its way via the first bypass valve 12 and the smoothing choke 20.

In the field weakening region (region b), the main valve 24 in the DC control element 8 is now fired additionally during the "on" period of the supplemental valve 14. This opens a secondary path 24, 22 to the path 14, 2 for the current i, and the field current i$_F$ can no longer increase. The armature current i$_A$, however, continues to rise. Through a suitable choice of the firing times for the supplemental valve 14 and for the main valve 24 of the D.C. control element 8, the ratio of the field current i$_F$ to the armature current i$_A$ and thus, the degree of excitation, can be adjusted continuously.

Figure 4:
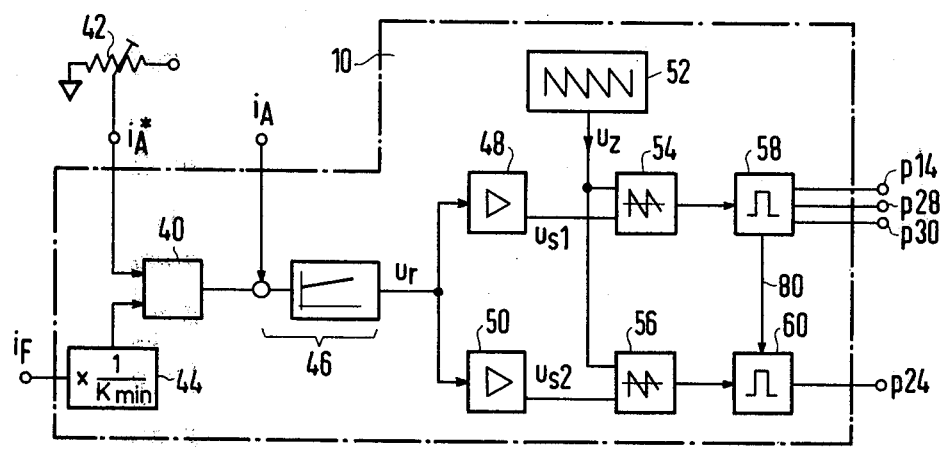
FIG. 4 is an embodiment of a control and regulating circuit useful in the circuits of FIGS. 1 and 2.

In FIG. 4, a control and regulating circuit 10 is shown which produces a fixed quenching output pulse p 28 for a DC control element 8. It contains a minimum selection circuit 40, into which the desired armature current valve i$_A$* is set by a reference value generator 42, and a signal i$_F$/K$_{min}$ is sent by a multiplier 44. The multiplier 44, which may be an operational amplifier having a gain of 1/K$_{min}$, is addressed by the actual value i$_F$ of the field current. At the multiplier 44, the minimum permissible value K$_{min}$ of the field weakening constant K is set in reciprocal form. In accordance with the previously chosen example K$_{min}$=⅓, the gain may therefore be 3. The minimum selection circuit 40 delivers as the output signal either the reference value i$_A$* or the signal i$_F$/K$_{min}$, and specifically, that one of these two signals which has the smaller absolute value.

The output signal of the minimum selection circuit 40 and the actual value i$_A$ of the armature current are fed to the comparator of an armature current regulator 46. The regulator output signal u$_r$ (control range, for instance, 0 to 10 V) is fed to first and second matching amplifiers 48 and 50, respectively. These are set differently, and deliver first and second control voltages u$_{s1}$ and u$_{s2}$, respectively. The two control voltages u$_{s1}$ and u$_{s2}$ are fed, together with the output signal u$_z$ of a sawtooth generator 52, to a first and a second comparator 54 and 56, respectively. The output signal u$_z$ has a frequency which is equal to the desired pulse rate frequency of the DC control element 8. A first pulse forming stage 58 is connected to the output of the first comparator 54. Depending on the intersection points of u$_z$ and u$_{s1}$ and the rear flanks in the output signal u$_z$, the stage 58 delivers firing signals p14, p28, p30 which are fed to the individual valves 14, 28 and 30 in FIG. 2. Similarly, a second pulse forming stage 60 is connected to the output of the second comparator 56. Depending on the intersection points of u$_z$ and u$_{s2}$, this stage delivers a firing signal p24, which is fed to the main valve 24 of the control element 8 in FIG. 2. To ensure the charge reversal of the quenching capacitor 26, the firing signal p24 must always be delivered simultaneously with the firing signal p30; synchronizing line p80 is provided between pulse forming stages 58 and 60 for this purpose.

Figure 5:
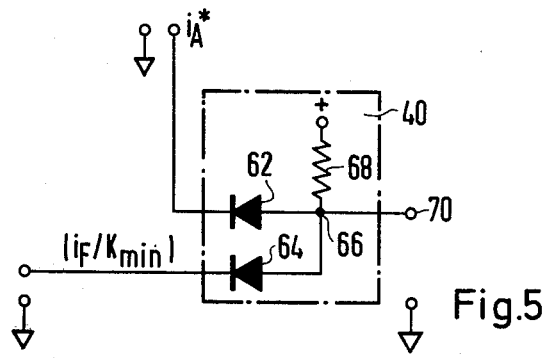
FIG. 5 is an embodiment of a minimum selection circuit useful in the circuit of FIG. 4.

In FIG. 5, an embodiment of the minimum selection circuit 40 is shown. Positive reference value i$_A$* and signal i$_F$/K$_{min}$ signals are fed via diodes 62 and 64, respectively, oriented in the blocking direction, to a tie point 66. Tie point 66 is also connected to a resistor 68 which, in turn, is connected to the positive terminal of a DC source which supplies a voltage greater than that of the signals i$_A$* and and i$_F$/K$_{min}$. Depending on the magnitude of the two signals, one of the diodes 62 and 64 conducts, so that either signal i$_A$* or the signal i$_F$/K$_{min}$ (plus the threshold value of the associated diode) can be taken off at the output 70.

In the following, the operation of the control and regulating circuit 10 shown in FIG. 4 will be explained; the three possible operating conditions will be considered individually.

a. Operation without Field Weakening (See FIG. 6)

In this mode, the armature voltage u$_A$ is always smaller than the DC voltage u. Also, the armature current i$_A$ is always equal to the field current i$_F$, i.e., for values of K$_{min}$ less than 1, the value (i$_F$/K$_{min}$) is always larger than the actual value i$_A$ of the armature current and therefore also larger than the reference value i$_A$* of the armature current. Therefore, the signal (i$_F$/K$_{min}$) is compared with the reference value i$_A$* and thus must not be compared with the actual value i$_A$. In this operation, the reference value i$_A$* is delivered at the output of the minimum selection circuit 40.

In the following, it is assumed that the output voltage u$_r$ of the armature current regulator 46 can vary only in the range from 0 to 5 V in operation without field weakening (region a), and that the matching amplifier 48 then delivers a control voltage u$_{s1}$ which is in the range from 0 to somewhat less than 10 V (see FIG. 6). The matching amplifier 50, on the other hand, is designed so that its output control voltage u$_{s2}$, for an input voltage u$_r$ between 0 and 5 V, is below 0 V. Thus, in operation without field weakening, the second comparator 56 is not activated and so forms no firing pulses p24 for the main valve 24. The only firing pulses (firing signals p24) delivered to the main value 24 serve for the charge reversal and which are identical with the firing signal p30 for the reversing valve 30. The output voltage u$_z$ is assumed to have a maximum value of 10 V.

Figure 6:
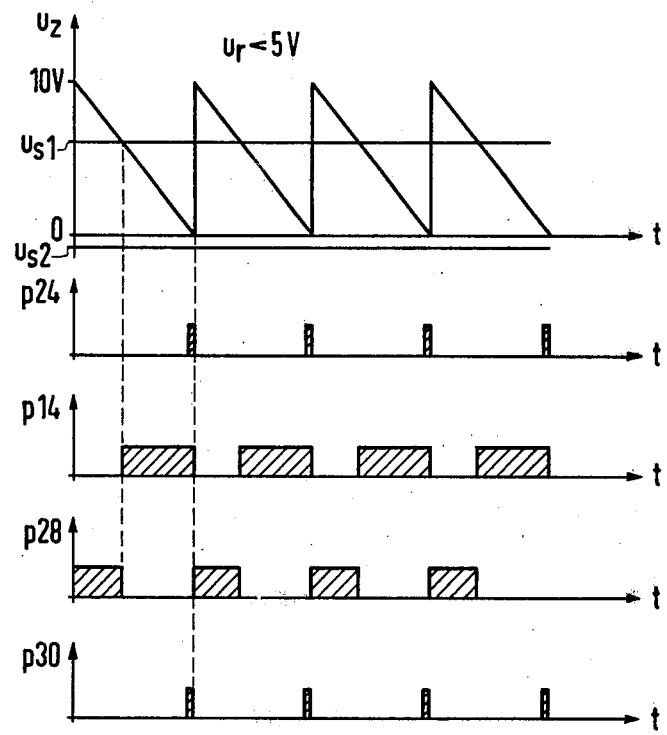
FIG. 6 shows the waveforms of control signals during operation outside the field weakening region.

It is seen from FIG. 6 that the first control voltage u$_{s1}$, which is compared in the comparator 54 with the sawtooth shaped output voltage u$_z$, leads to the formation of correspondingly movable firing pulses. In the region in which the sawtooth voltage u$_z$ is larger than the first control voltage u$_{s1}$, pulses are formed which are passed on as the firing signal p28 to the quenching valve 28. Conversely, in the region in which the output voltage u$_z$ is smaller than the first control voltage u$_{s1}$, pulses for the supplemental valve 14 are formed. These are passed on as the firing signal p14 to the supplemental valve 14. Shortly before each quenching process (see firing signal 28), the main valve 24 and the reversing valve 30 must be fired, so that the quenching capacitor 26 in the DC control element 8 can reverse its charge. It can be seen in FIG. 6 that the firing signals p24 and p30 are delivered at the same time.

b. Operation with Field Weakening (FIG. 7)

When going to operation with field weakening, the output voltage $u_r$ of the armature current regulator 46 increases beyond the assumed value of 5 V. Now, also, the second comparator 56 is effective since the second control voltage $u_{s2}$ takes a value greater than 0 V.

Figure 7:
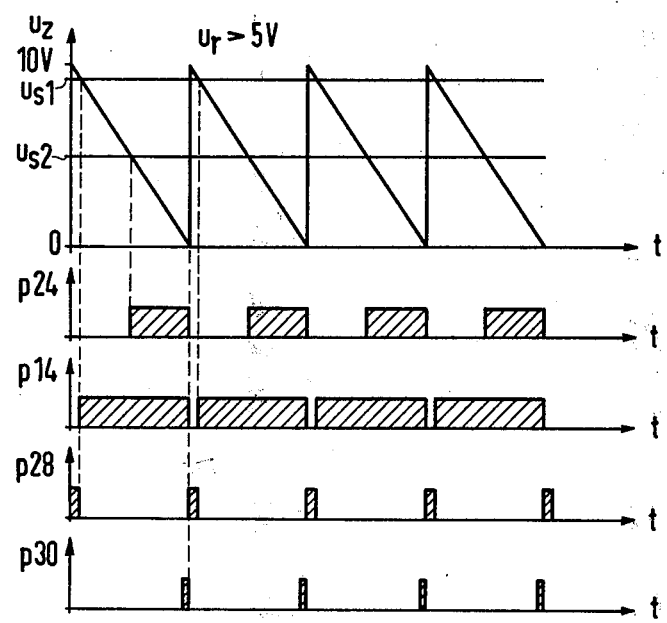
FIG. 7 shows the waveforms of control signals during operation within the field weakening region.

According to FIG. 7, the supplemental valve 14, when the regulator output voltage $u_r$ is 5 V, reaches the degree of control of approximately 1 and the supplemental valve 14 conducts almost permanently. The armature voltage $u_A$ of the DC machine has almost reached the full value u. In order to prevent decline of the armature current $i_A$, with further increasing speed n, the main valve 24 in the DC control element 8 is now fired in addition to the supplemental valve 14. The closer the second control voltage $u_{s2}$ comes to the first control voltage $u_{s1}$ (the latter is just below 10 V), the smaller becomes the time interval in which voltage is applied to the field winding 4 and the longer is the bypass phase. The current i from the DC source flows predominantly via the main valve 24 during field weakening operation.

As soon as the output voltage $u_r$ exceeds a value of 5 V, the first control voltage $u_{s1}$ can no longer increase. It remains at just under 10 V, so that the quenching valve 28 remains switched on for a certain minimum time ("respect distance"); during this minimum time the quenching capacitor 26 is charged to the level of the input voltage.

For the field weakening, the region in which the two control voltages $u_{s1}$ and $u_{s2}$ are close together is of special interest. So that the lower range of the control voltage $u_{s2}$ can be traversed relatively quickly, the gain of the matching amplifier 50 can be made a function of the regulator output voltage $u_r$.

c. Operation with Field Weakening and Armature Current Reduction

This operation, which is shown in FIG. 3 between points 2 and 3, can likewise be carried out with the control and regulating circuit 10 of FIG. 4.

As already mentioned, the degree of field weakening K must not fall below a definite minimum limit $K_{min}$ at high speeds n. Therefore, the armature current $i_A$ must be reduced in proportion to the reduction of the field current $i_F$. This reduction is effected so that from the speed $n_2$ on, the degree of field weakening K remains constant and is held at the lowest permissible degree of field weakening $K_{min}$. As the value $(i_F/K_{min})$ is smaller than the reference value $i_A^*$ in this region, the minimum selection circuit 40 switches over and, at its output, the value $(i_F/K_{min})$ appears instead of the value $i_A^*$. This value is from then on fed to the armature current regulator 46 as the reference value. The operation of the control and regulating device 10 with this new reference value is the same as that described under b above. The timing diagrams shown in FIG. 7 therefore apply.

FIG. 8 shows a braking circuit for mixed regenerative and resistance braking operation of a propulsion vehicle (subway, trolley car) operated from a DC trolley line system. However, the vehicle could also be supplied, for instance, from an on board battery as the DC source. It is assumed that the travel/brake lever (not shown) of the vehicle is brought into the brake position "brake" and that thereby the speed control circuit of the propulsion vehicle has been regrouped (by means of contacts switching at no current, not shown) into the braking circuit shown. Because of the motion of the propulsion vehicle, the DC series machine, which is coupled to the drive axle and consists of an armature winding 2 and an excitation or field winding 4, operates as a generator. Thus, an armature voltage $u_A$ is present at the armature winding 2.

The armature winding 2 and the field winding 4 are connected in series with each other via smoothing choke 20 and a stabilizing resistor 50. The stabilizing resistor 50 can be shorted by a switch 51, particularly a switching contactor. This switch 51 is actuated in a manner known in the art under certain operating conditions.

Included in the braking circuit is a DC control element 8 having positive and negative terminals 56 and 57, respectively. This element receives firing signals z8 and quenching signals 18. The DC control element 8 may be designed in accordance with German Pat. No. 12 42 289; it is arranged so that an armature current $i_A$ can flow along the path from the armature winding 2 via the smoothing choke 20, the stabilizing resistor 50 or the associated switch 51, the positive terminal 56, the DC control element 8, and finally, via the negative terminal 57, back the armature winding 2.

Connected in parallel to the DC control element 8 is a series circuit consisting of the field winding 4 and a switch valve 14. The field winding 4 is directly connected to the positive terminal 56 of the DC control element 8. The switch 14 may be, in particular, a supplemental controlled valve, preferably a thyristor, as shown. It will be called the "field valve 14" in the following. The field valve is quenched by the quenching device of the DC control element 8 at the same time.

Shunted across the field winding 4 is an uncontrolled bypass valve 16. The latter is polarized so that the field current $i_F$ can flow from the field winding 4 via this bypass valve 16 directly back to the field winding 4. The anode of the bypass valve 16 is connected to the anode of the field valve 14.

The mutual relationship of the four components 8, 4, 14 and 16 is retained when switching from travel to braking operation and vice versa. This is advantageous, because it makes the regrouping relatively simple.

Connected parallel to the DC control element 8 is further a braking branch which consists of a braking resistor 52 in series with a braking switch or specifically, a controlled braking valve 53. A thyristor can likewise be used as the braking valve 53. The latter is polarized in the flow direction of the generator armature current $i_A$.

The positive terminal 56 of the DC control element 8 is connected via an uncontrolled return valve 12a and a smoothing choke 58 to a positive terminal 54. The return valve 12a can, but need not, be the bypass valve 12 which was assigned to speed control operation before the regrouping. The negative terminal 57 of the DC control element 8 is connected directly to a negative terminal 55. A DC source 6, which has the DC voltage u, is connected between the two terminals 54, 55. This can be, in particular, the already mentioned trolley overhead system. This arrangement is provided for the mixed regenerative and resistance operation.

A storage capacitor 59 is further arranged between the junction point of the smoothing choke 58 and the return valve 12a on the one hand and the negative terminal 55, on the other hand. The storage capacitor 59 and the smoothing choke 58 together form an LC filter.

Depending on whether the DC source 6 is able to absorb energy or not, the energy produced by the series DC machine as a generator is either fed back into the DC source 6 (regenerative braking) or converted into heat in the braking resistor 52 (resistance braking) during a braking operation. This process has been described in German Offenlegungsschrift No. 23 29 146 and need not be explained here. For the sake of simplification, we can assume in the following that the braking valve 53 is being fired continuously and that we thus have pure resistance braking operation.

In the braking circuit of FIG. 8 it is possible to set the field current $i_F$ independently of the armature current current $i_A$ when the series DC machine 2, 4 is braked. When operating at high speed, it permits the field current $i_F$ to be kept smaller than the armature current $i_A$ (field weakening). Thereby, any desired braking torque, and particularly desirably, a small braking torque, can be set in the upper speed range. The braking circuit shown also provides continuous weakening of the field, i.e., without steps and also without mechanical switches. This is possible not only for operation of the DC control element 8 near zero but in the entire duty cycle range. In mixed regenerative and resistance braking operation, it is therefore possible to feed the largest possible amount of energy produced in generator operation back into the DC source 6.

Operation of the control of the braking circuit of FIG. 8 is shown in the charts of FIGS. 9 to 12.

The DC control element 8 is controlled by the "method with fixed quenching pulse", i.e., the period T with which quenching pulses 18 are always delivered to the DC control element 8 at the time t2 is constant (FIG. 10), and the duty cycle of the DC control element 8 is influenced by the "on" duration by means of the firing pulse z8 of the DC control element 8 (FIG. 9). Other control methods can also be used, of course, such as the so-called "method with fixed main pulse".

By changing the respective time t2 of the firing pulses z8 relative to the respective time t3, the mean value $\overline{i_A}$ of the armature current $i_A$ can be varied. By varying the respective firing instant t1 of the firing pulse z14 for the field valve 14 (FIG. 14), which is always ahead of the firing instant t2, on the other hand, the mean value $\overline{i_F}$ of the field current $i_F$ is set.

The field weakening is accomplished, as will be seen in FIGS. 9 to 12, by firing the main valve of the DC control element 8 at the instant t2 shortly after the field valve 14 is fired at the instant t1. Thereby, the field winding 4 is shorted. During the "on" phase of the DC control element 8 between the times t2 and t3, part of the armature current $i_A$ flows through the field winding 4 and the field valve 14, and another part of the armature current $i_A$ flows via the DC control element 8. During this "on" phase, the armature current $i_A$ is increasing. After the DC control element 8 and the field valve 14 are turned off (extinguished), both of which events take place at the instant t3, the field current $i_F$ continues to flow via the bypass valve 16. In the process, it is decreasing. During this time, the armature current $i_A$ now flows, while decreasing, via the braking resistor 52; with regenerative braking it would flow into the DC source 6 instead. When the field valve 14 is fired next at the time t1', part of the armature current $i_A$ flows through the field winding 4, and the field current $i_F$ increases again up to the instant t2', when DC control element 8 is fired.

In FIG. 12, the mean values $\overline{i_A}$ and $i_F$ are shown as dashed horizontal lines. It can be seen that the ratio of field current $i_F$ to armature current $i_A$ can be varied continuously through a suitable choice of firing times t1, t1' for the field valve 14, and of firing times t2, t2' for the main valve of the DC control element 8. If the armature current $i_A$ is to be equal to the field current $i_F$, then only the field valve 14 is fired. In this case the quenching device of the DC control element 8 remains in operation so that the field valve 14 can also be cut off (extinguished) again at any desired instant.

Figure 13:
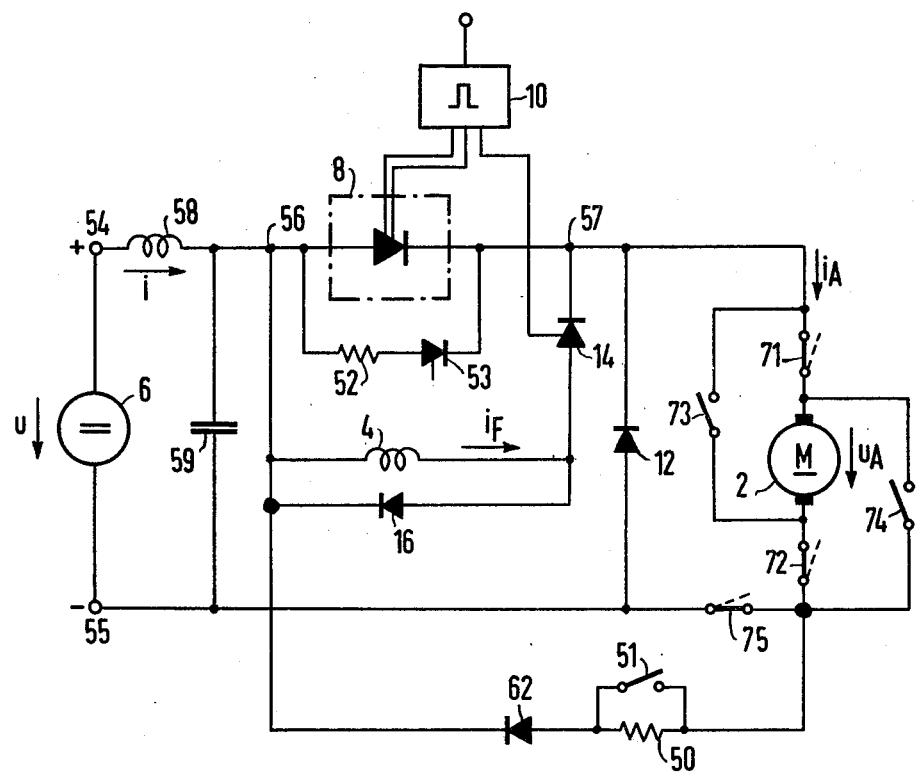
FIG. 13 is an embodiment of a speed control circuit like that of FIG. 1, illustrating the use of five switches for changing the operative mode of the DC machine.

In FIG. 13, still another embodiment of the speed control circuit of FIG. 1 is shown. Here, the braking resistor 52 and the controlled braking valve 53, connected in series, are shunted across the DC control element 8. The terminals of the DC control element 8 are again designated 56, 57. For switching from speed control to braking operation and vice versa, switching means are provided consisting of five switches 71 to 75. The four switches 71 to 74 serve for reversing the armature winding 2. The two switches 71, 72 and the two switches 73, 74 are always operated together. The switch positions shown in FIG. 13 are those used for running operation. The switch 75 is connected into the negative line between the switch 72 and the bypass valve 12. The switches 71 and 72 (closed here) are connected adjacent to the armature winding 2, and each switch 73 and 74 (open here) shorts the series circuit consisting of the armature winding 2 and a switch 71 or 72, respectively. Between the junction of the switches 72 and 75, on the one hand, and the terminal 56 at the anode of the DC control element 8, on the other hand, is connected a series circuit consisting of a blocking diode 62 and the stabilizing resistor 50. The latter can be shorted out by the switch 51. The control arrangement for the DC control element 8 and the field valve 14 is again designated 10.

To switch from speed control to braking, the five switches 71 to 75 are operated into the other switch position. The resulting braking circuit is that shown in FIG. 14, except that switches 71 to 74 are omitted.

The braking circuit of FIG. 14 differs from that of FIG. 8 in that the return valve 12, which was the bypass valve 12 of the speed control circuit, is placed in the negative connecting line between the terminal 55 and the terminal 57. Furthermore, the circuit of FIG. 14 uses valve 62 as a second return valve, whereas in the prior circuit it served as the blocking diode 62 of the speed control circuit. Here it is connected between the positive terminal of the armature winding 2 and the terminal 56.

Operation of the braking circuit of FIG. 14 is the same as that of the braking circuit of FIG. 8.

What is claimed is:

1. A braking circuit for a series DC machine which is operated in the field-weakening region at least at high speed and in which the armature and field winding are connected together in a series circuit and which has a DC control element which is pulsed in braking operation and conducts at least part of the armature current, comprising a series circuit including the field winding and a switch, connected in parallel to the DC control element, and a by-pass valve connected parallel to the field winding and in the cut-off direction for the armature current.

2. A braking circuit in accordance with claim 1 in which the DC control element comprises a controlled main valve and a quenching device connected in parallel and in which the switch is a supplemental controlled valve.

3. A braking circuit in accordance with claim 1 in which a stabilizing resistor is connected in series to the armature winding and in which a switch is connected across the stabilizing resistor for shorting it out of the armature winding circuit.

4. A braking circuit in accordance with claim 1 in which a smoothing choke is connected between the DC control element and the armature winding of the DC series machine.

5. A braking circuit in accordance with any one of claims 1 to 4 having a return valve for connection to a DC source which can absorb current for regenerative braking operation.

6. A braking circuit in accordance with any one of claims 1 to 4 in which the series circuit comprising a braking resistor and a braking switch is shunted across the DC control element for resistance braking operation.

7. A braking circuit in accordance with any one of claims 1 to 4, having a return valve for connection to a DC source which can absorb current at least some of the time and in which DC control element is shunted by the series circuit comprising a braking resistor and a braking switch for mixed regenerative and resistance braking operation.

8. A braking circuit in accordance with any one of claims 1 to 4 having means for switching to and from a speed control circuit configuration.

9. A braking circuit in accordance with claim 8, in which the switching means includes two double pole switches operated jointly for reversing the armature winding.

10. A braking circuit in accordance with claim 9 in which the two switches comprise the contacts of a switching relay.

11. A braking circuit in accordance with claim 5 having means for switching to and from a speed control circuit configuration.

12. A braking circuit in accordance with claim 6 having means for switching to and from a speed control circuit configuration.

13. A braking circuit in accordance with claim 7 having means for switching to and from a speed control circuit configuration.

14. A braking circuit in accordance with claim 11, in which the switching means includes two double pole switches operated jointly for reversing the armature winding.

15. A braking circuit in accordance with claim 12, in which the switching means includes two double pole switches operated jointly for reversing the armature winding.

16. A braking circuit in accordance with claim 13, in which the switching means includes two double pole switches operated jointly for reversing the armature winding.

* * * * *